United States Patent [19]

Gleeson, Jr.

[11] 4,048,564
[45] Sept. 13, 1977

[54] TRANSCEIVER TEST DEVICE

[76] Inventor: Thomas Paul Gleeson, Jr., 2118 William St., Cape Girardeau, Mo. 63701

[21] Appl. No.: 752,124

[22] Filed: Dec. 20, 1976

Related U.S. Application Data

[63] Continuation-in-part of Ser. No. 652,149, Jan. 26, 1976, abandoned.

[51] Int. Cl.² .................... H04B 1/38; H04B 17/00
[52] U.S. Cl. ..................................... 325/67; 325/16; 325/133; 325/363
[58] Field of Search .............. 325/15, 16, 67, 133, 325/134, 363

[56] References Cited

U.S. PATENT DOCUMENTS

| 3,667,045 | 5/1972 | Combs | 325/15 |
| 3,737,782 | 6/1973 | Pierce | 325/363 |

*Primary Examiner*—Richard Murray
*Assistant Examiner*—Marc E. Bookbinder
*Attorney, Agent, or Firm*—Edward F. Connors

[57] ABSTRACT

A device for testing two way radios, particularly Citizen Band mobile transceivers, includes a console with a front panel having meters for displaying rf power, percent modulation, rf voltage, transceiver output frequency, DC voltage and AC voltage, a channel selector for testing various channel frequencies and a signal level adjust knob permitting receiver sensitivity testing, a test sequence selector for controlling operation of the device in self test, transmit test and receive test modes, a coaxial connector for receiving an antenna connector of a transceiver to be tested, and AC and DC power hookup sockets. Within the console are a transmit test circuit for receiving the output of a transceiver to be tested via the antenna connector and the coaxial connector including a frequency counter providing a frequency signal corresponding to the frequency of the transceiver output for display by the frequency meter and a signal processing circuit for selectively supplying signals representative of the transceiver output power and percent modulation to the appropriate meters, and a receive test circuit for supplying a test signal to the coaxial connector for supply to the transceiver to be tested via the antenna connector such that the test signal can be heard on a speaker of the transceiver.

18 Claims, 6 Drawing Figures

TRANSCEIVER TEST DEVICE

CROSS REFERENCE TO RELATED APPLICATION

This application is a continuation in part of application Ser. No. 652,149 filed Jan. 26, 1976, now abandoned.

BACKGROUND OF THE INVENTION

1. Field of the Invention

The present invention pertains to testing of two way radios or transceivers and, more particularly, to a currency operated device capable of providing a complete test of the receive and transmit operations of a transceiver.

2. Discussion of the Prior Art

Recently, two way radios, particularly Citizen Band mobile transceivers, have been used not only as a hobby or novelty item but as a necessary piece of equipment for travellers in that such transceivers have considerable value as a safety device in the event of an emergency on the highway as well as providing convenient communication for many other purposes involved with driving, business and the like. Accordingly, it is important to be able to determine whether a transceiver is performing properly at all times; and, there, thus, exists a need for a simple, rapid and inexpensive quantitative test device for transceivers. Since most mobile Citizen Band transceivers installed in vehicles are mounted in a fashion so as to be easily removable in order that truck drivers, for instance, can move their radios from vehicle to vehicle quickly and easily, and to permit removal of a radio when a vehicle is parked in a high theft area, it is desirable to have a transceiver test device of a size to be located in convenient places of business. Such a test device must be simple to operate and provide step by step instructions such that little or no intervention is required by employees of the place of business to aid a customer in operating the test device.

SUMMARY OF THE INVENTION

Accordingly, it is a primary object of the present invention to fulfill the above need by providing a transceiver test device which can quickly, simply and inexpensively thoroughly test a transceiver and provide results of the test in a manner to be easily noted.

A further object of the present invention is to provide a transceiver test device which is operative in response to insertion of a predetermined amount of currency in a currency receptor to actuate a timer and permit testing for a predetermined time.

Another object of the present invention is to provide a transceiver test device housed in a console having a front panel with meters mounted thereon to display rf transmitter power and percent modulation, rf voltage, transceiver output frequency, and DC and AC operating voltage while containing a limited number of knobs and switches to permit signal level adjustment, testing on various channel frequencies and control test sequence. The front panel also has appropriate sockets to permit connection of an antenna connector of a transceiver to be tested and to provide operating power for the transceiver to be tested.

The present invention has an additional object in that a transceiver test device has a test sequence selector to permit self testing of the transceiver test device as well as to permit testing of the transmit and receive functions of a transceiver.

The present invention is generally characterized in a transceiver test device including panel means mounting a connector adapted to receive an antenna connector of a transceiver to be tested, a power socket for supplying electrical operating power to the transceiver to be tested, and an indicator for displaying power received from the transceiver to be tested, a transmit test circuit including means for receiving the output of the transceiver to be tested via the antenna connector thereof and the connector, and a signal processor for supplying a signal representative of the transceiver output to the indicator to display output power received from the transceiver to be tested, a receive test circuit including means for supplying a test signal to the connector for supply to the transceiver to be tested via the antenna connector thereof such that the test signal can be heard on a speaker of the transceiver to be tested, power supply circuitry for supplying electrical operating power to the power socket, the transmit test circuit and the receive test circuit, the power supply circuitry including a timer for controlling supply of the electrical operating power for a predetermined time, and a currency receptor for actuating the timer in response to receipt of a predetermined amount of currency whereby the transceiver test device is operative for the predetermined time to permit transmit and receive testing of the transceiver to be tested.

Some of the advantages of the present invention over the prior art are that transceivers can be thoroughly tested for proper receive and transmit operation inexpensively in a minimum amount of time, and the transceiver test device of the present invention is simple to operate thereby permitting its placement in places of business which are open long hours since an owner of a transceiver can easily determine for himself the proper testing procedure, and the transceiver test device is reliable requiring little servicing.

Other objects and advantages of the present invention will become apparent from the following description of the preferred embodiment taken in conjunction with the accompanying drawings.

DESCRIPTION OF THE PREFERRED EMBODIMENT

Figure 1:
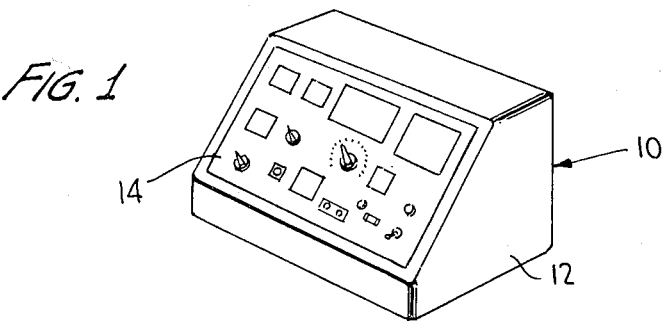
FIG. 1 is a perspective view of a transceiver test device console according to the present invention.
Figure 1A:
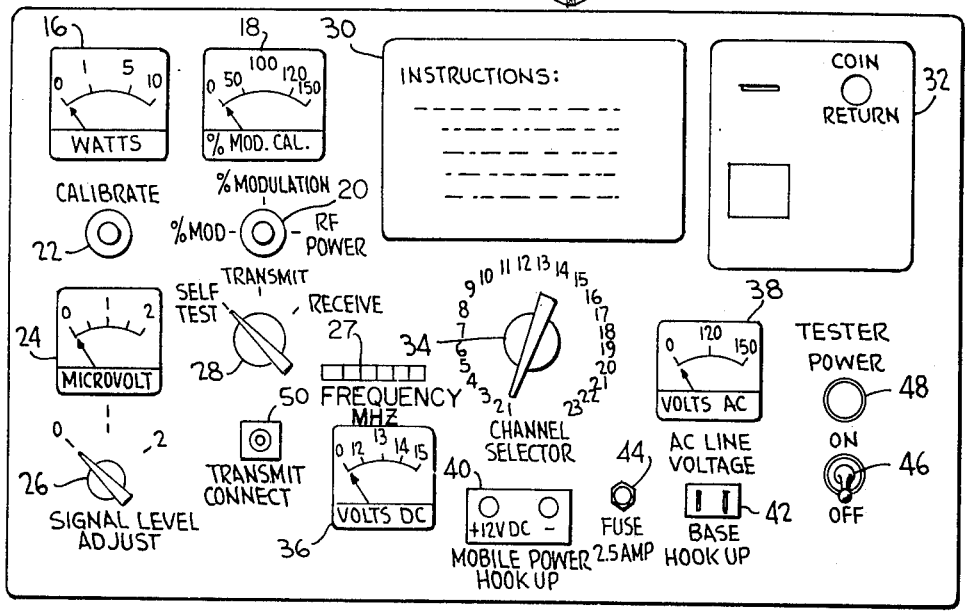
FIG. 1a is a front elevation of the front panel of the transceiver test device console of the present invention.
Figure 2:
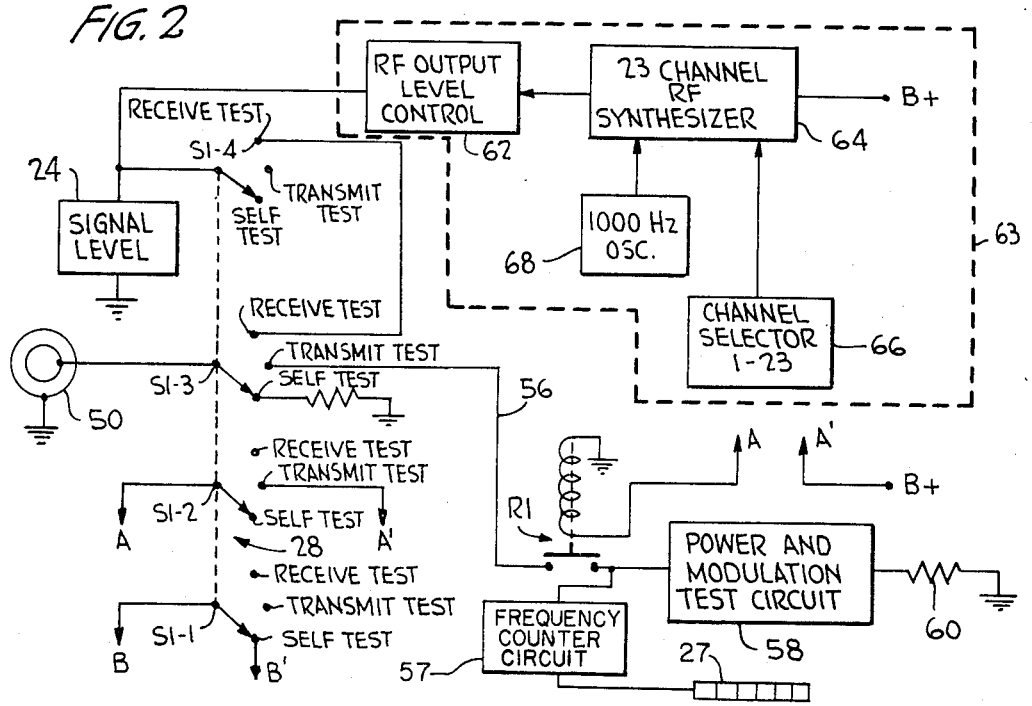
FIG. 2 is a block diagram of the overall system of the transceiver test device of the present invention.

A transceiver test device 10 according to the present invention is shown in FIGS. 1 and 2 and includes a console housing 12 of a size and shape as to be easily positioned on a counter top, pedestal or other support in establishments such as retail electronics shops, filling stations, truck stops, super markets, quick sale shops and other service places of business. Preferably, the console housing is 14 inches high, 20 inches wide and 12 inches deep, and the console is powered by generally available 120 volt AC electricity. On the left portion of a front panel 14 of the console housing are a wattmeter 16, a percent modulation meter 18, a control knob 20 controlling operation of the meters 16 and 18 and associated signal processing circuits to be described hereinafter, a calibration knob 22 for the percent modulation meter 18, a microvolt rf signal level meter 24, a signal level adjust knob 26, a digital transceiver output frequency meter 27 and a test sequence selector 28. Along the top center of the front panel 14 is an operating instructions placard 30 and in the top right of the front panel is a currency receptor 32, such as a coin receptor unit which can be of any conventional construction, for instance the Series 5-14 coin receptor unit manufactured by National Rejectors Industries. As will be described in more detail hereinafter, the currency receptor 32 actuates a timer to energize the transceiver test device console 10 for a predetermined time to permit testing procedures to be implemented; and, if desired, a dollar bill validator could be used in place of or in combination with the coin receptor unit. Below the operating instructions placard 30 is a channel selector 34, a DC output voltage meter 36, an AC line voltage meter 38, a mobile station power hookup socket 40, a base station power hookup socket 42, a 2.5 amp fuse 44, a power on/off switch 46 and a tester power indicator lamp 48. A coaxial connector 50 is disposed adjacent the DC voltage meter 36 for providing a connection with the antenna connector of a transceiver to be tested.

An overall block diagram of the transceiver test device 10 is shown in FIG. 2 wherein the test sequence control knob 28 is shown as operating three-position switches S1-1, S1-2, S1-3 and S1-4, simultaneously. In a first or self test position, the contact arm of switch S1-1 connects terminals B and B' in the power supply and timer circuit of FIG. 5, the contact arms of switches S1-2 and S1-4 are on open terminals and the contact arm of switch S1-3 connects the inner lead of connector 50 through a 52Ω resistor 54 to ground. In a second or transmit test position, the contact arms of switches S1-1 and S1-4 are on open terminals, and the contact arm of switch S1-2 connects terminals A and A' while the contact arm of switch S1-3 connects the inner lead of connector 50 via a coaxial lead 56 with a frequency counter circuit 57 supplying a frequency signal to digital frequency meter 27 and a power and modulation transmit test circuit 58 which is grounded through a 52Ω resistor 60, the lead 56 being controlled by a relay R1 operated by B' voltage from the power supply via terminals A-A' and switch S1-2. In a third or receive test position, the contact arms of switches S1-1 and S1-2 are on open terminals, and the switch arms of switches S1-3 and S1-4 are connected to common terminals such that the inner lead of connector 50 is connected with the output of an rf output level control circuit 62 of a 23-channel receive test circuit 63, the output level control circuit 62 receiving an input from a 23-channel rf synthesizer 64 which receives inputs from a channel selector 66 to control channel frequency from a 1000 Hz oscillator 68 to produce a modulated test signal. The output of rf level control 62 is also connected with signal level meter 24.

The frequency counter circuit 57 can be of any conventional circuitry; and, for example, the frequency counter circuit 57 and the digital frequency meter 27 can be combined in a single unit housed in the console 12, such as the digital frequency counter No. 277-111 manufactured by Radio Shack, a division of Tandy Corporation.

Figure 3:
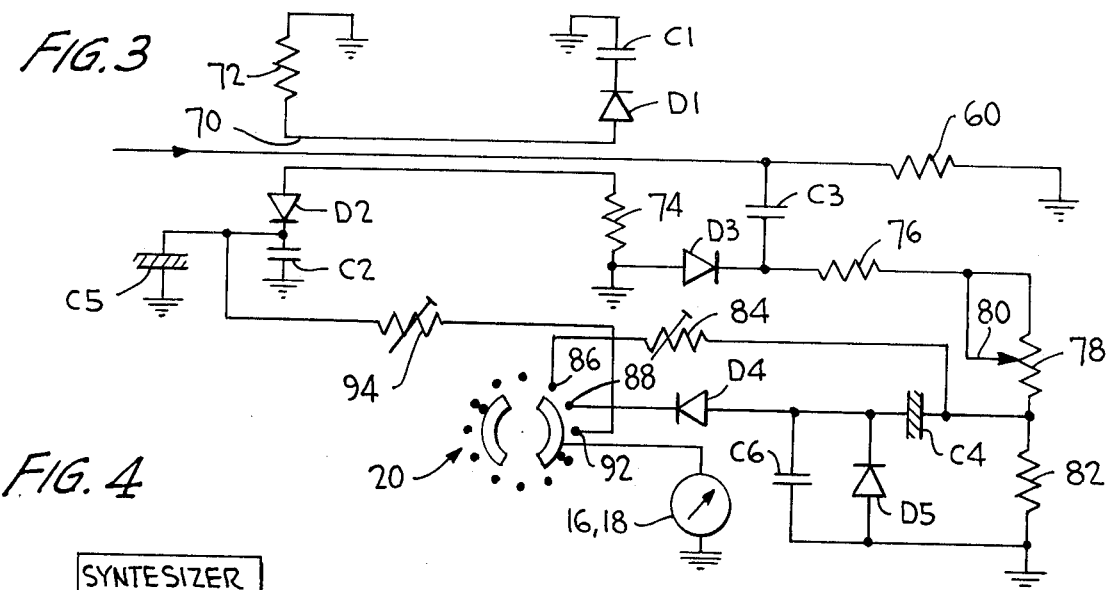
FIG. 3 is a schematic diagram of the transmit test circuit of the transceiver test device of the present invention.

The power and modulation transmit test circuit 58 is illustrated in FIG. 3 wherein coaxial lead 56 is shown as being terminated by resistor 60. The coaxial lead 56 has a shield 70 which is grounded on one side through a 100Ω resistor 72 and through a diode D1 and a 0.01 $\mu f$ capacitor C1; and, on the other side, the shield is grounded through a 100Ω resistor 74 and through a diode D2 and a 0.01 $\mu f$ capacitor C2. The signals on lead 56 are coupled to a signal processing circuit through a 10 $\mu f$ capacitor C3 to the junction of the cathode of a diode D3 and a 1KΩ resistor 76, the anode of diode D3 being grounded. Resistor 76 is connected with a potentiometer 78 having a tap 80 movable with rotation of percent modulation calibrate knob 22, and potentiometer 78 is connected to ground through a 1.8 KΩ resistor 82. A variable 10KΩ resistor 84 is connected between the junction of potentiometer 80 and resistor 82 and a contact 86 of switch knob 20, and the series combination of a 10 $\mu f$ cpacitor C4 and a diode D4 is connected between the junction of potentiometer 78 and resistor 82 and a contact 88 on switch knob 20. A contactor 90 of switch knob 20 is connected to ground through the wattmeter 16, and a contact 92 of the switch knob 20 is connected to the junction of a 3.3 $\mu f$ capacitor C5 and capacitor C2 through a variable 10KΩ resistor 94. A diode D5 and a 0.005 $\mu f$ capacitor C6 are connected in parallel from the junction of diode D4 and capacitor C4 to ground.

Figure 4:
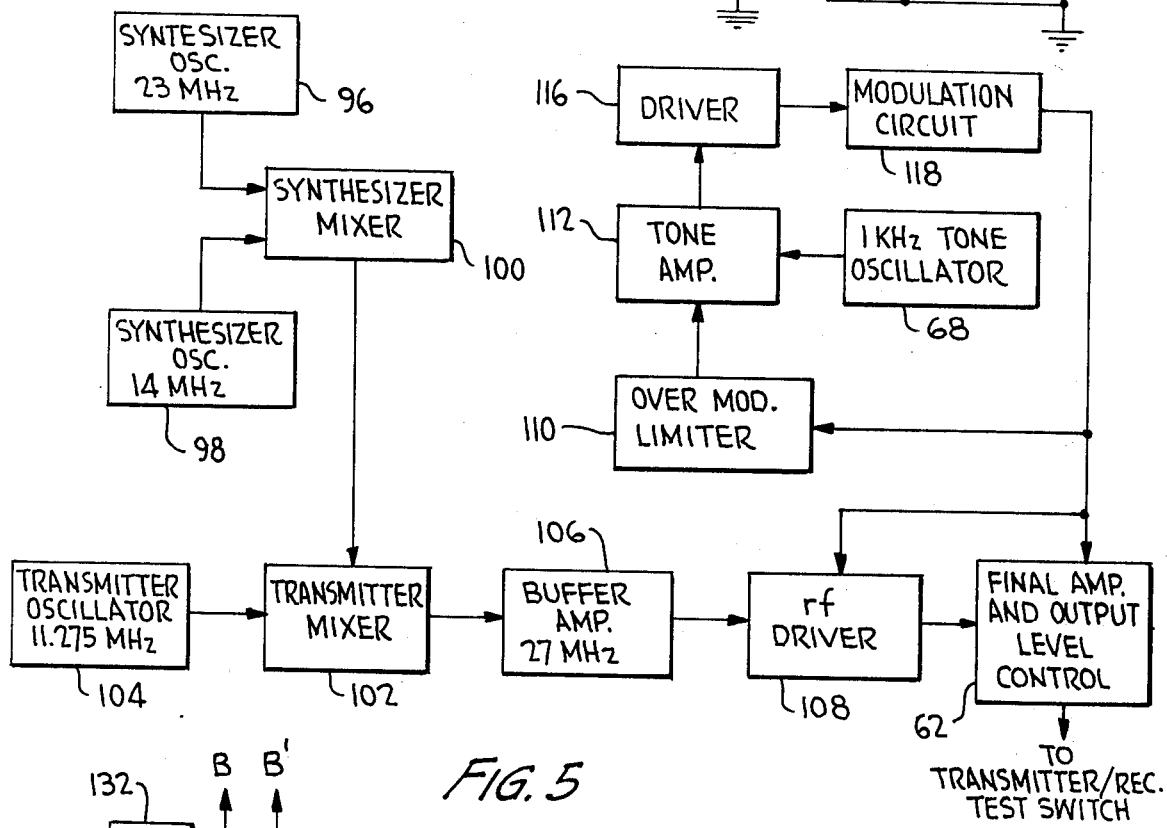
FIG. 4 is a block diagram of the receive test circuit of the transceiver test device of the present invention.

The 23-channel receive test circuit 63 is shown in FIG. 4 and includes a 23 MHz synthesizer oscillator 96 and a 14MHz synthesizer oscillator 98 supplying inputs to a synthesizer mixer 100 which supplies an output to a transmitter mixer 102 for mixing with the output from an 11.275 MHz transmitter oscillator 104. The output of transmitter mixer 102 is supplied through a buffer amplifier 106 to an rf driver 108. An over-modulation limiter 110 supplies a control input to a tone amplifier 112 which also receives a 1KHz tone from oscillator 68, and the output of tone amplifier 112 is supplied to a driver 116 which supplies signals to rf driver 108 and over-modulation limiter 110 through a modulation circuit 118. The rf driver 108 and the modulation circuit 118 supply outputs to output level control 62 which is connected with signal level meter 24 and connector 50 via switches S1-4 and S1-3 of test sequence selector 28. The signal level adjust knob 26 operates the output level control such that the test signal produced by the receive test circuit can be adjusted from 0 to 2 microvolts. The synthesizer and modulation circuitry of the receive test circuit 63 is conventional with the exception of the 1KHz tone provided by oscillator 68 for modulation of the test signal, and reference is made to Realistic Model TRC-24B for more specific circuit details of the synthesizer and modulation circuitry.

Figure 5:
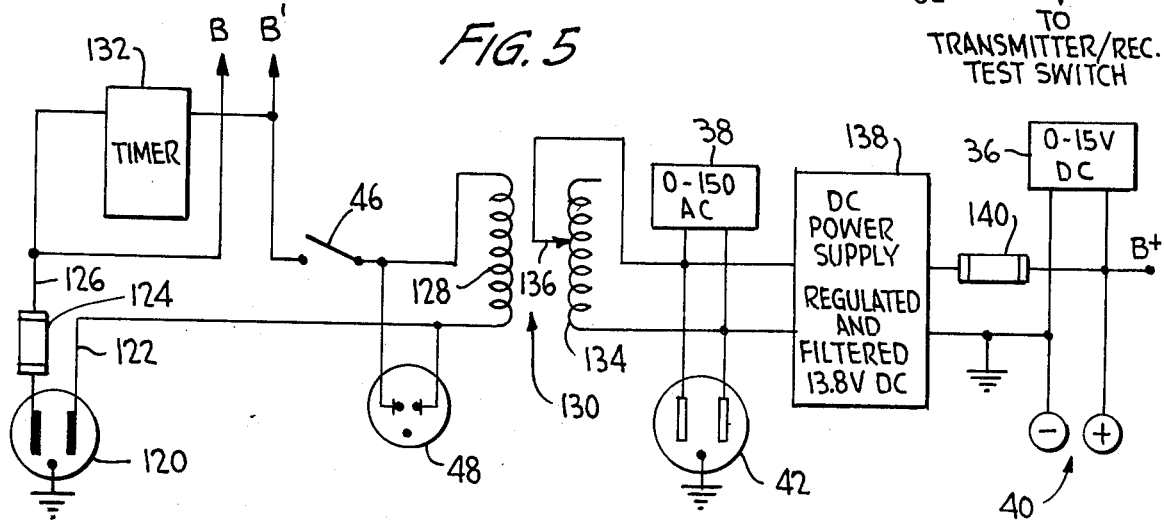
FIG. 5 is a schematic diagram of the power supply and timer circuit of the transceiver test device of the present invention.

The power supply and timer circuit is shown in FIG. 5 and includes a plug 120 adapted to be received in a receptacle for supplying 120v AC electrical power to the transceiver test 10. The plug 120 is connected with a lead 122 and through a fuse 124 with a lead 126, the lead 122 being connected with one end of a primary winding 128 of a transformer 130 and the lead 126 being connected with a timer 132 which is operated by the currency receptor 32. Terminals B and B' are in parallel with the timer switch. Terminal B' is connected via on/off switch 46 to the other end of primary winding 128, and the power indicator lamp 48 is connected in parallel with primary winding 128. Transformer 130 has a variable secondary winding 134 with a movable tap 136 connected with a DC power supply rectifier, regulator and filter circuit 138 with the DC power supply circuit 138 supplying 13.8 volts DC through a fuse 140 to mobile power hookup socket terminals 40 which have the voltage thereacross displayed on DC voltmeter 36. AC voltmeter 38 is connected across the secondary winding 134 and base hookup socket 42 is connected in parallel therewith. The DC power supply circuit 138 also supplies operating voltage for the components of the transceiver test device at the B+ terminal.

In operation, the transceiver test device 10 is located in a service establishment, and a customer wishing to test his transceiver, such as an AM Citizen Band radio, places the transceiver to be tested adjacent the console and connects the antenna connector of the transceiver to the connector 50. If the transceiver is of the mobile type, operating power is supplied by connecting the transceiver with the 12 volt DC mobile power hookup socket 40 while base stations can be supplied with operating power via the base hookup socket 42. In order to assure that the transceiver test device is in proper working order, the sequence selector 28 is turned to the self test position such that switch S1-1 connects terminals B and B' to thereby bypass the timer and energize the power supply circuit of FIG. 5, and the power switch 46 is turned on. With the power on, the DC output voltage on meter 36 should read approximately 13.8 volts while the AC line voltage on meter 38 should read approximately 120 volts. If the DC voltage is less than 13 volts, the proprietor of the establishment can adjust the line voltage upward to provide the correct DC voltage. With the sequence selector in the self test position, the low level signal of approximately 1 microvolt modulated with the 1000 Hz tone from oscillator 68 will be displayed at microvolt meter 24 and the position of the needle will indicate proper functioning of the system.

Once the self test has been completed to provide evidence that the transceiver test device is functioning properly, the customer inserts the required currency in either coin or bills in the currency receptor 32, and the receipt of a predetermined amount of currency will actuate the timer 132 to energize the power supply circuit for a predetermined time. The sequence selector 28 is now moved to the transmit position in order to test the transmitter of the transceiver to be tested; and, with the sequence selector in the transmit position, the inner lead of the coaxial cable extending from connector 50 will be connected to the frequency counter circuit 57 and the power and modulation test circuit 58 via switch S1-3 and relay R1 which is closed via switch S1-2. The knob 20 is set to "calibrate % mod", and the microphone switch on the transceiver under test is depressed while the calibrate knob 22 is adjusted until the pointer on the percent modulation meter 18 display moves to the "cal" position. The microphone switch is now released and the knob 20 is set to the "% modulation" position. The microphone switch is now depressed again, and the customer whistles loudly into the microphone while maximum percentage modulation achieved is read on meter 18, this reading being recorded on a card furnished at the console. The knob 20 is now moved to the "rf power" position, and the microphone is again depressed without speaking or blowing in the microphone while transmitter power from the transceiver is displayed on meter 16 and noted on the card under the heading "CW power". With the microphone switch depressed, the customer now whistles loudly into the microphone, and maximum power output with modulation is displayed on the wattmeter 16, this test result being noted on the card under "maximum output".

During the transmit test, the signal from the transceiver under test is supplied on coaxial cable 56 from connector 50 to the power and modulation test circuit 58, as shown in FIG. 3, the sheath of the coaxial cable being properly grounded via resistors 72 and 74, diodes D1 and D2 and capacitor C1 and C2. With the knob 20 in the calibrate position, the signal processing circuit is controlled such that changing of the variable resistor 94 by movement of calibrate knob 22 calibrates the signal processing circuit; and, with the knob 20 in the "% modulation" position, the signal is supplied to the meter 16 via the demodulator circuit comprising diodes D4 and D5 and capacitor C6. When the knob 20 is moved to the "rf power" position, power is supplied to meter 16 through resistor 84, it being appreciated that the knob 20 controls operation of the signal processing circuit and the meters 16 and 18 to assure proper display.

While the above described transmit power test is being conducted, the frequency counter circuit 57 provides a frequency signal corresponding to the frequency of the transceiver output to digital frequency meter 27 such that the transceiver output frequency is displayed on the console. A chart will be provided showing the actual frequency allotted for each channel and the allowable tolerance therefor such that the customer can test the transmit frequency of any or all of the channels of his transceiver. To this end, it is noted that the number of AM channels has been increased from 23 to 40, and the receive test circuitry can be conventionally modified to operate on all 40 channels thereby permitting both transmit frequency testing and receive testing on all 40 channels.

Once the transmit test has been completed, the test sequence selector 28 is moved to the receive test position to test the receiver of the transceiver, and the signal level adjust knob 26 is set to the 1 position. The channel selector 34 is set to channel 1, and the channel selector on the transceiver under test is similarly set to channel 1. The 1KHz test signal tone should be heard through the built-in speaker of the transceiver under test since the receive test circuit 63 of the console is connected to the connector 50 via switches S1-4 and S1-3. If no tone is heard, either there is no channel crystal in the transceiver under test or the receiver sensitivity of the transceiver is inadequate. To determine sensitivity of the receiver, the signal level adjust selector 26 is moved to the 2 position; and, if a tone is heard on the receiver, the receiver sensitivity is greater than 1 microvolt. If no tone is heard, the selector 34 is moved to the next channel with the selector on the transceiver similarly moved and then to additional channels in sequence until a tone is heard. When a tone is heard on subsequent channels, the signal level is droped from 2 to 1 microvolts. Most good radios should be able to detect a signal of 1 microvolt in amplitude with respect to receiver noise while the better radios generally have a receiver sensitivity of ½ microvolt. The customer now proceeds to test each of the 23 or 40 channels in the same manner as set forth above, and the card furnished is marked indicating which channels are active on the transceiver under test.

The time provided by the timer 132 to test a transceiver should be sufficient to permit the above testing procedure to be completed; and, once the predetermined time has expired, the timer switch will open to remove operating power from the transceiver test device components. If more time is desired, additional currency can be inserted in the currency receptor to actuate the timer again. Of course, the transceiver test device could be utilized without the time control in situations where supervision of use of the transceiver test device is available or where the transceiver test device is used frequently by an operator, such as use on a test bench. Additionally, it will be appreciated that the timer could be actuated by any suitable means should it be desired not to have the timer directly actuated by a currency receptor. For example, the timer could be actuated by a token or coded ticket or the timer could be actuated by a switch manually operated by an individual supervising use of the transceiver test device, for instance after receiving a required amount of currency.

The transceiver test device of the present invention is compact, simple to operate and should require a minimum of servicing with the components as above described; however, any suitable circuitry could be used in the transmit test and receive test circuits and, similarly, digital readouts could be provided on the front panel in place of the analog meters disclosed.

What is claimed is:

1. A transceiver test device comprising
   panel means mounting connector means adapted to receive an antenna connector of a transceiver to be tested, power socket means for supplying electrical operating power to the transceiver to be tested, and indicator means for displaying power received from the transceiver to be tested;
   transmit test means including means for receiving the output of the transceiver to be tested via the antenna connector thereof and said connector means, and signal processing means for supplying a signal representative of the transceiver output to said indicator means to display output power received from the transceiver to be tested;
   receive test means including means for supplying a test signal to said connector means for supply to the transceiver to be tested via the antenna connector thereof such that the test signal can be heard on a speaker of the transceiver to be tested;
   power supply circuitry for supplying electrical operating power to said power socket means, said transmit test means and said receive test means, said power supply circuitry including timer means for controlling supply of said electrical operating power for a predetermined time; and
   currency receptor mens for actuating said timer means in response to receipt of a predetermined amount of currency whereby said transceiver test device is operative for said predetermined time to permit transmit and receive testing of the transceiver to be tested.

2. A transceiver test device as recited in claim 1 wherein said panel means includes modulation meter means for displaying percent modulation of the output of the transceiver to be tested, said signal processing means includes circuit means for providing a signal representative of percent modulation to said modulation meter means, and said transmit test means includes switch means controlling operation of said signal processing means to supply said power signal to said indicator means or said percent modulation signal to said modulation meter means.

3. A transceiver test device as received in claim 1 and further comprising test sequence selector means having a transmit test position for connecting said transmit test means with said connector means, a receive test position for connecting said receive test means with said connector means, and a self test position closing a switch across said timer means to supply electrical operating power to said power socket means and said receive test means, and said panel means counts operating voltage meter means for displaying electrical operating voltage and rf voltage meter means for displaying voltage of said receive test means test signal.

4. A transceiver test device as recited in claim 1 wherein said transmit test means includes frequency counter means for receiving the transceiver output and providing a frequency signal corresponding to the frequency of the transceiver output, and said panel means includes frequency meter means receiving said frequency signal from said frequency counter means for displaying the frequency of the transceiver output.

5. A transceiver test device as recited in claim 4 wherein said frequency meter means includes a digital display.

6. A transceiver test device as recited in claim 1 wherein said receive test means includes channel selector means for supplying said test signal on selected channel frequencies whereby the transceiver to be tested can be tested for receive operation on various channels.

7. A transceiver test device as recited in claim 6 wherein said receive test means includes output level control means for adjusting the voltage of said test signal whereby sensitivity of the transceiver to be tested can be determined.

8. A transceiver test device as recited in claim 6 wherein said panel means includes modulation meter means for displaying percent modulation of the output of the transceiver to be tested and said signal processing means includes circuit means for providing a signal representative of percent modulation to said modulation meter means.

9. A transceiver test device as receited in claim 8 wherein said transmit test means includes switch means controlling operation of said signal processing means to supply said power signal to said indicator means or said percent modulation signal to said modulation meter means.

10. A transceiver test device as recited in claim 9 and further comprising test sequence selector means having a transmit test position for connecting said transmit test means with said connector means and a receive test position for connecting said receive test means with said connector means.

11. A transceiver test device as recited in claim 10 wherein said test sequence selector means has a self test position closing a switch across said timer means to supply electrical operating power to said power socket means and said receive test means, and said panel means mounts operating voltage meter means for displaying electrical operating voltage and rf voltage meter means for displaying voltage of said receive test means test signal.

12. A transceiver test device as recited in claim 11 wherein said receive test means includes output level control means for adjusting the voltage of said test signal whereby sensitivity of the transceiver to be tested can be determined.

13. A transceiver test device comprising
panel means mounting connector means adapted to receive an antenna connector of a transceiver to be tested, and indicator means for displaying power received from the transceiver to be tested;
transmit test means including means for receiving the output of the transceiver to be tested via the antenna connector thereof and said connector means, and signal processing means for supplying a signal representative of the transceiver output to said indicator means to display output power received from the transceiver to be tested;
receive test means including channel selector means for supplying a test signal on selected channel frequencies to said connector means for supply to the transceiver to be tested via the antenna connector thereof such that the test signal can be heard on a speaker of the transceiver to be tested to permit testing of the receive operation of the transceiver on various channels; and
test sequence selector means having a transmit test position for connecting said transmit test means with said connector means and a receive test position for connecting said receive test means with said connector means.

14. A transceiver test device as recited in claim 13 wherein said transmit test means includes frequency counter means for receiving the transceiver output and providing a frequency signal corresponding to the frequency of the transceiver output, and said panel means includes frequency meter means receiving said frequency signal from said frequency counter means for displaying the frequency of the transceiver output.

15. A transceiver test device as recited in claim 13 wherein said panel means mounts power socket means for supplying electrical operating power to the transceiver to be tested, and further comprising power supply circuitry for supplying electrical operating power to said power socket means, said transmit test means and said receive test means, said power supply circuitry including timer means for controlling supply of said electrical operating power for a predetermined time, and means for actuating said timer means whereby said transceiver test device is operative for said predetermined time to permit transmit and receive testing of the transceiver to be tested.

16. A transceiver test device as recited in claim 15 wherein said test sequence selector means has a self test position closing a switch across said timer means to supply electrical operating power to said power socket means and said receive test means, and said panel means mounts operating voltage meter means for displaying electrical operating voltage and rf voltage meter means for displaying voltage of said receive test means test signal.

17. A transceiver test device as recited in claim 16 wherein said panel means includes modulation meter means for displaying percent modulation of the output of the transceiver to be tested, said signal processing means includes circuit means for providing a signal representative of percent modulation to said modulation meter means, and said transmit test means includes switch means controlling operation of said signal processing means to supply said power signal to said indicator means or said percent modulation signal to said modulation meter means.

18. A transceiver test device as recited in claim 17 wherein said transmit test means includes frequency counter means for receiving the transceiver output and providing a frequency signal corresponding to the frequency of the transceiver output, and said panel means includes digital frequency meter means receiving said frequency signal from said frequency counter means for digitally displaying the frequency of the transceiver output.

* * * * *